United States Patent
Wright (10) Patent No.: US 11,269,640 B2
(45) Date of Patent: Mar. 8, 2022

(54) SPECULATIVE TRANSITIONS AMONG MODES WITH DIFFERENT PRIVILEGE LEVELS IN A BLOCK-BASED MICROARCHITECTURE

(71) Applicant: QUALCOMM Incorporated, San Diego, CA (US)

(72) Inventor: Gregory Michael Wright, Chapel Hill, NC (US)

(73) Assignee: Qualcomm Incorporated, San Diego, CA (US)

( * ) Notice: Subject to any disclaimer, the term of this patent is extended or adjusted under 35 U.S.C. 154(b) by 402 days.

(21) Appl. No.: 15/431,763

(22) Filed: Feb. 13, 2017

(65) Prior Publication Data

US 2018/0232233 A1 Aug. 16, 2018

(51) Int. Cl.
| | |
|---|---|
| *G06F 9/38* | (2018.01) |
| *G06F 12/0813* | (2016.01) |
| *G06F 12/0864* | (2016.01) |
| *G06F 12/1009* | (2016.01) |
| *G06F 12/0842* | (2016.01) |

(Continued)

(52) U.S. Cl.
CPC ........ *G06F 9/3806* (2013.01); *G06F 9/30189* (2013.01); *G06F 9/3842* (2013.01); *G06F 9/3861* (2013.01); *G06F 12/0223* (2013.01); *G06F 12/06* (2013.01); *G06F 12/0813* (2013.01); *G06F 12/0842* (2013.01); *G06F 12/0864* (2013.01); *G06F 12/1009* (2013.01); *G06F 2212/6032* (2013.04); *G06F 2212/7201* (2013.01)

(58) Field of Classification Search
CPC ............................. G06F 9/3842; G06F 9/3861
See application file for complete search history.

(56) References Cited

U.S. PATENT DOCUMENTS

| | | | |
|---|---|---|---|
| 7,209,994 B1 | 4/2007 | Klaiber et al. | |
| 8,078,792 B2 | 12/2011 | Serebrin et al. | |
| 8,561,060 B2 | 10/2013 | Serebrin et al. | |
| 8,756,605 B2 | 6/2014 | Aingaran et al. | |
| 9,280,447 B2 | 3/2016 | Farrell et al. | |
| 9,858,200 B1 * | 1/2018 | Griffin | G06F 12/1027 |

(Continued)

FOREIGN PATENT DOCUMENTS

| | | |
|---|---|---|
| EP | 0220920 A1 | 5/1987 |
| EP | 2717156 A1 | 4/2014 |

OTHER PUBLICATIONS

International Search Report and Written Opinion—PCT/US2018/015678—ISA/EPO—dated Jun. 21, 2018.
Taiwan Search Report—TW107105193—TIPO—dated Jan. 6, 2022.

*Primary Examiner* — Jacob Petranek
(74) *Attorney, Agent, or Firm* — Muncy, Geissler, Olds & Lowe, P.C.

(57) ABSTRACT

The disclosure relates to processing in-flight blocks in a processor pipeline according to an expected execution mode to reduce synchronization delays that could otherwise arise due to transitions among processor modes with varying privilege levels (e.g., user mode, supervisor mode, hypervisor mode, etc.). More particularly, a program counter associated with an instruction block to be fetched may be translated to one or more execute permissions associated with the instruction block and the instruction block may be associated with a speculative execution mode based at least in part on the one or more execute permissions. Accordingly, the instruction block may be processed relative to the speculative execution mode while in-flight within the processor pipeline.

30 Claims, 7 Drawing Sheets

(51) Int. Cl.
  *G06F 12/02*   (2006.01)
  *G06F 12/06*   (2006.01)
  *G06F 9/30*    (2018.01)

(56) References Cited

U.S. PATENT DOCUMENTS

| | | | |
|---|---|---|---|
| 2002/0042874 A1* | 4/2002 | Arora | G06F 9/30079 |
| | | | 712/229 |
| 2005/0086451 A1 | 4/2005 | Yates, Jr. et al. | |
| 2006/0149981 A1* | 7/2006 | Dieffenderfer | G06F 9/30054 |
| | | | 713/320 |
| 2007/0094475 A1* | 4/2007 | Bridges | G06F 12/1054 |
| | | | 711/207 |
| 2009/0204785 A1 | 8/2009 | Yates, Jr. et al. | |
| 2009/0313695 A1* | 12/2009 | Bridges | G06F 12/145 |
| | | | 726/21 |
| 2010/0169623 A1* | 7/2010 | Dice | G06F 9/3842 |
| | | | 712/229 |
| 2011/0153926 A1* | 6/2011 | Fang | G06F 12/0895 |
| | | | 711/105 |
| 2012/0151185 A1 | 6/2012 | Bybell et al. | |
| 2014/0101412 A1* | 4/2014 | Ramirez | G06F 9/30054 |
| | | | 712/205 |
| 2015/0006862 A1* | 1/2015 | Gschwind | G06F 9/3861 |
| | | | 712/226 |
| 2015/0277967 A1* | 10/2015 | Calciu | G06F 9/528 |
| | | | 711/147 |
| 2017/0083343 A1* | 3/2017 | Burger | G06F 9/3867 |
| 2018/0157595 A1* | 6/2018 | Jindal | G06F 12/1009 |

* cited by examiner

SPECULATIVE TRANSITIONS AMONG MODES WITH DIFFERENT PRIVILEGE LEVELS IN A BLOCK-BASED MICROARCHITECTURE

TECHNICAL FIELD

The various aspects and embodiments described herein generally relate to reducing delays in a processor pipeline, and in particular, to speculative transitions among modes with different privilege levels in a block-based microarchitecture.

BACKGROUND

In most modern computer architectures, a central processing unit (CPU) defines a mode bit (e.g., in a system control register) to indicate whether a process, thread, instruction etc. is executing in a restricted (or non-privileged) "user mode" versus an unrestricted (or privileged) "supervisor mode." The mode bit tends to affect many aspects of the instruction execution, including which instructions are legal, whether the instruction can touch a virtual memory page (e.g., to fetch instructions and/or data), and so on. For example, instructions executing in the supervisor mode, which is sometimes referred to as "kernel" mode, "privileged" mode, or other terminology, are assumed to be trusted and generally allowed to reference any memory location(s) and perform any operation that the underlying CPU architecture permits. On the other hand, instructions executing in the user mode do not have unrestricted direct hardware access and are not permitted to access any memory location(s) allocated to the operating system kernel or to other programs. However, programs executing in user mode can issue a system call to request a service that the kernel provides (e.g., to perform privileged instructions, access resources outside the limited virtual memory space allocated to the user program, etc.). The system call may cause a temporary transition from user mode to supervisor mode and a subsequent return to user mode after the system call has been processed. Other events that can cause a mode transition may include hardware interrupts (e.g., a signal generated when a user presses a key on a keyboard, a clock generates a timed pulse, etc.), exceptions due to invalid or malicious program behavior, and so on.

The user-supervisor separation has several advantageous aspects, including greater security and greater stability. For example, the separation between user mode and supervisor mode provides hardware-enforced restrictions to limit access to resources that could otherwise be accidentally or maliciously exploited. Furthermore, the separation between user mode and supervisor mode affords additional protection in the sense that a machine can recover when code running in user mode crashes whereas a crash in supervisor mode will usually cause a fatal error from which the machine cannot safely recover. Further still, some machines may offer additional execution modes with different privilege levels, such as a "hypervisor" mode that is even more privileged than the supervisor/kernel mode, multiple user modes with hierarchical privileges (e.g., ring-based security), and so on, whereby various privilege levels can be defined to improve fault tolerance and protect against malicious behavior, among other things.

Nonetheless, in a typical CPU, changing the execution mode (e.g., on a system call, exception/interrupt, return from kernel mode to user mode, etc.) is a heavyweight operation tending to involve a full pipeline synchronization. In particular, a full pipeline synchronization is performed to ensure that instructions belonging to different modes are not active in the pipeline simultaneously. Often, that means that every in-flight user instruction has to commit before the first privileged instruction will even be fetched. In a high-performance out-of-order deeply-pipelined machine, the full pipeline synchronization required to change the execution mode can therefore carry a substantial performance cost, even to execute simple low-level system calls (e.g., to get the time of day) or process exceptions/interrupts because the machine grinds to a halt while the transition to or from the operating system kernel takes place. As such, mechanisms to reduce the costs due to transitions among modes with different privileges are desired.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, as described in further detail herein, a method for managing a processor pipeline may comprise translating a program counter associated with an instruction block to be fetched to one or more execute permissions associated with the instruction block, associating the instruction block with a speculative execution mode based at least in part on the one or more execute permissions, and processing the instruction block relative to the speculative execution mode while the instruction block is in-flight within the processor pipeline.

According to various aspects, an apparatus may comprise a processor configured to fetch an instruction block, translate a program counter associated with the instruction block to one or more execute permissions associated with the instruction block, associate the instruction block with a speculative execution mode based at least in part on the one or more execute permissions, and process the instruction block relative to the speculative execution mode while the instruction block is in-flight within a pipeline.

According to various aspects, an apparatus may comprise means for translating a program counter associated with an instruction block to be fetched to one or more execute permissions associated with the instruction block, means for associating the instruction block with a speculative execution mode based at least in part on the one or more execute permissions, and means for processing the instruction block relative to the speculative execution mode while the instruction block is in-flight within a pipeline.

According to various aspects, a computer-readable medium may store computer-executable instructions configured to cause a processor to translate a program counter associated with an instruction block to be fetched to one or more execute permissions associated with the instruction block, associate the instruction block with a speculative execution mode based at least in part on the one or more execute permissions, and process the instruction block relative to the speculative execution mode while the instruction block is in-flight within a pipeline associated with the processor.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

According to various aspects, as will be described in further detail herein, a block-based microarchitecture may implement speculative transitions among execution modes that have different privilege levels (e.g., user mode to/from supervisor mode, supervisor mode to/from hypervisor mode, etc.). As such, the speculative mode transitions may allow instructions from execution modes that have different privilege levels to execute concurrently in a processor pipeline, including branch predictions to/from execution modes with higher privilege levels (e.g., for system calls and returns). As such, the cost to make a system call via an instruction executing in user mode can be reduced to approximately the same cost as a regular subroutine call. In general, the speculative transitions among different execution modes are described herein in the context of a block-based instruction set architecture (ISA), in which instructions are grouped into instruction blocks that have a variable size (subject to a maximum) and a header to indicate how many instructions are in each respective instruction block. However, those skilled in the art will appreciate that the speculative mode transitions may be employed in other suitable architectures, including architectures in which each instruction block has one instruction, instructions are individually fetched, etc.

Figure 1:
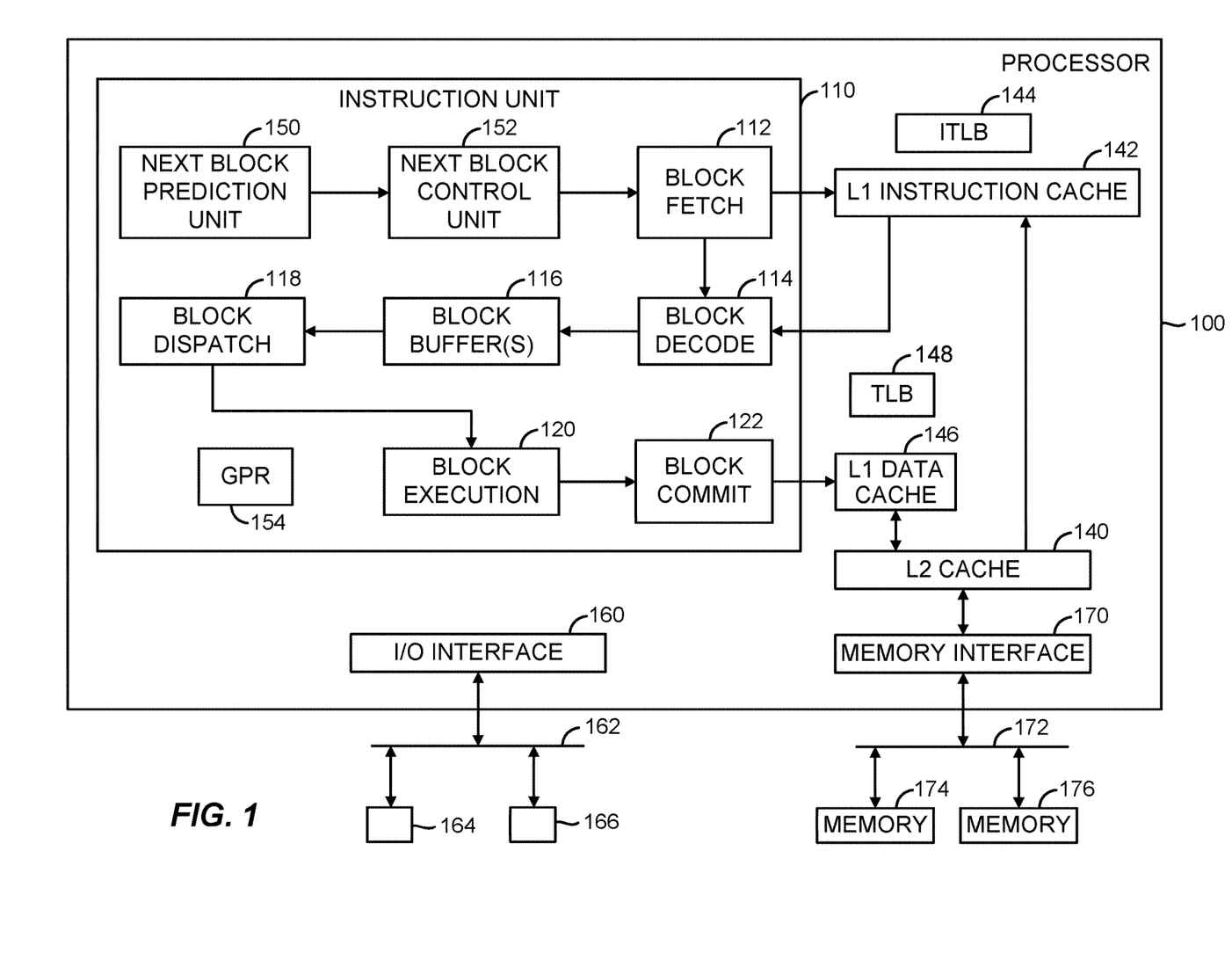
FIG. 1 illustrates an exemplary processor architecture configured to implement speculative transitions between different execution modes, according to various aspects.

Before discussing the mechanisms used to implement the speculative execution mode transitions, exemplary elements and operational aspects associated with a block-based microarchitecture are described. In this regard, FIG. 1 illustrates an exemplary processor 100 having an architecture configured to implement speculative transitions between different execution modes with varying privilege levels (e.g., user, supervisor, hypervisor, etc.). As shown in FIG. 1, the processor 100 executes instructions in an execution pipeline 110, wherein the instructions that are executed in the execution pipeline 110 may generally be grouped into instruction blocks that have a variable size with a header used to indicate how many instructions are grouped within each respective block (e.g., one or more instructions, up to a maximum size permitted within an individual block). As such, the processor 100 may implement a block-based instruction set architecture (ISA) in which an "instruction block" groups one or more instructions that are fetched and processed as a unit, meaning that each instruction block is processed atomically in the block-based ISA (i.e., either all the instructions within the instruction block will be committed at the same time or else none will be committed). Furthermore, in various embodiments, the pipeline 110 may be a super-scalar design, with multiple, parallel pipelines, and a General Purpose Register (GPR) file 154 may provide one or more registers that are accessible to various elements in the pipeline 110.

According to various aspects, the instruction blocks that are executed in the pipeline 110 may be determined according to control logic, which may be implemented at least in part in a next block prediction unit 150 and a next block control unit 152. In general, the next block prediction unit 150 may predict an execution path in the pipeline 110 in a manner analogous to a branch predictor used in a conventional out-of-order (OOO) processor in order to predict a next block to be fetched and executed in the pipeline 110. For example, in various embodiments, the next block prediction unit 150 may predict exits from committed and/or in-flight instruction blocks within the pipeline 110 from among one or more possible block exits, which may be used to predict a target (next) block in the execution sequence. However, those skilled in the art will appreciate that other suitable prediction schemes may be suitably employed. In various embodiments, the next block prediction unit 150 may provide one or more signals to the next block control unit 152 to indicate the predicted next block, wherein a program counter (PC) maintained at the next block control unit 152 may hold a virtual memory address that points to the next block to be executed in the pipeline 110.

In various embodiments, the pipeline 110 may further include a block fetch stage 112, which fetches instruction blocks from a first-level (L1) instruction cache (I-cache) 142, with memory address translation and permissions managed at an Instruction-side Translation Lookaside Buffer (ITLB) 144. Data may be accessed from an L1 data cache (D-cache) 146, with memory address translation and permissions managed at a main Translation Lookaside Buffer (TLB) 148. In various embodiments, the ITLB 144 may comprise a copy of part of the main TLB 148, or the ITLB 144 and the main TLB 148 may alternatively be integrated. Similarly, in various embodiments, the L1 instruction cache 142 and the L1 data cache 146 may be integrated or unified. Misses in the L1 instruction 142 and/or the L1 data cache 146 may cause an access to a second level (L2) cache 140, depicted as a unified instruction and data cache 140 in FIG. 1, although other embodiments may include separate L2 caches. Misses in the L2 cache 140 may cause an access to main (off-chip) memory 174, 176 via a memory interface 170, which may be a master input to a bus interconnect 172 implementing a shared bus to one or more memory devices 174, 176. Additional master devices (not shown) may additionally connect to the bus interconnect 172. The processor 100 may further include an input/output (I/O) interface 160, which may be a master device on a peripheral bus 162 across which the I/O interface 160 may access various peripheral devices 164, 166. However, those skilled in the art will recognize that numerous variations of the processor 100 are possible. For example, one or more of the functional blocks depicted in the processor 100 10 may be omitted from a particular embodiment and other functional blocks that may reside in the processor 100, such as a JTAG controller, an instruction predecoder, a branch target address cache, and the like that are not germane to the speculative mode transitions as described herein are omitted for clarity.

In various embodiments, after the instruction blocks have been appropriately fetched, the fetched instruction blocks may be forwarded to a block decode stage 114, which may decode the instruction(s) in the instruction blocks (e.g., translating opcodes into control signals, reading appropriate registers, etc.). After decoding, the instruction blocks may be held in one or more block buffers 116 pending execution. For example, in various embodiments, a block dispatch unit 118 may schedule or otherwise distribute instructions from the block buffers 116 to a block execution stage 120, which may include one or more execution units (not explicitly shown). For example, the one or more execution units in the block execution stage 120 may comprise an arithmetic logic unit (ALU), a floating-point unit, or other suitable execution units that can provide results from instruction execution to a block commit unit 122, which in turn may store the execution results in the L1 data cache 146.

According to various aspects, as mentioned above, the processor 100 may operate in at least two different modes, which may be referred to herein as "user mode" and "supervisor mode." In general, the user mode may be a restricted or non-privileged mode in which certain instructions are not permitted, memory access is limited to a particular virtual memory space, etc., whereas the supervisor mode (sometimes alternatively called "kernel mode" or variants thereof) is an unrestricted or privileged mode usually reserved to trusted code that has greater privileges and the ability to directly interact with underlying physical hardware. Furthermore, some machines may support additional execution modes with different privilege levels. For example, some machines may run a native or bare-metal hypervisor directly on hardware to control underlying virtualized hardware resources and manage one or more guest operating systems that may be sharing the virtualized hardware resources, wherein the native or bare-metal hypervisor may operate in a mode that has even more privileges than the supervisor mode. In another example, a hosted hypervisor can be used to provide virtualization at the operating system level, wherein the hosted hypervisor runs on the operating system to support one or more guest operating system instances that share a single operating system kernel. Accordingly, those skilled in the art will appreciate that various different processor architectures may generally support at least two execution modes and potentially more than two execution modes with different privilege levels.

Figure 2:
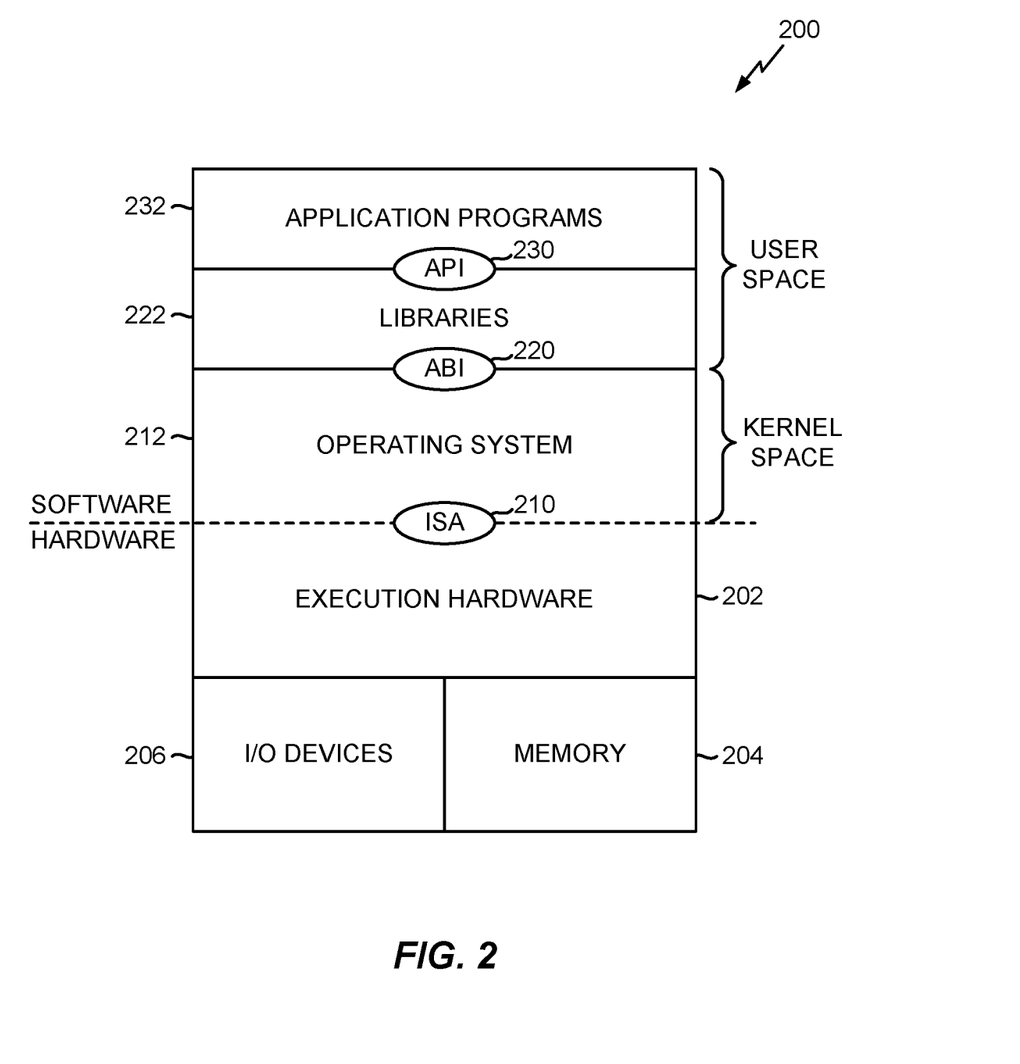
FIG. 2 illustrates an exemplary layered computer architecture including various logical components and interfaces in which speculative transitions between different execution modes may be implemented, according to various aspects.

For example, FIG. 2 illustrates an exemplary layered computer architecture 200 that includes various logical components and interfaces to explain certain aspects and differences between user mode and supervisor mode as contemplated herein. However, as mentioned above, the computer architecture 200 may support additional execution modes, such as a hypervisor mode with more privileges than the supervisor mode, although the description herein focuses on the user and supervisor modes for clarity.

In particular, as shown in FIG. 2, the example architecture 200 includes both hardware components and software components, wherein the hardware components generally include physical memory 204, input/output (I/O) devices 206, and execution hardware 202 (e.g., an application processor, a digital signal processor, etc.). The software components may include an operating system 212, a libraries module 222, and one or more application programs 232. Accordingly, the application programs 232 generally use an application program interface (API) 230 to issue library calls to the libraries module 222, which may use an application binary interface (ABI) 220 to invoke services on the operating system 212 (e.g., via system calls). The operating system 108 therefore runs instructions in supervisor mode to communicate with the hardware components using a specific instruction set architecture (ISA) 210, which may include specific operation codes (opcodes) and native commands implemented on the execution hardware 202. The ABI 220 defines the machine as seen from the perspective of the application program processes, whereas the API 232 specifies the machine characteristics as seen from the perspective of a high-level language program and the ISA 210 defines the machine as seen from the perspective of the operating system 212. In various embodiments, as further shown in FIG. 2, wherein the software components may be further divided into a kernel space and a user space to provide hardware protection from malicious or unexpected software behavior.

In general, software in the user space runs in user mode and software in the kernel space runs in supervisor mode. The distinction between the user space and the kernel space generally refers to separations that are defined at the operating system 212, whereas distinctions between user mode and supervisor mode (and any additional modes that may be defined) are enforced at the underlying execution hardware 202. Nonetheless, control can and often does switch between user mode instructions that run in the user space and more privileged instructions that run in the kernel space. For example, a hardware timer may be implemented to periodically interrupt the processor and return control to a kernel timer interrupt handler, which can be useful to regain control from a user program stuck in a loop, to implement mutual exclusion, enable concurrent programs to operate correctly, etc. In other examples, a transition from user mode to supervisor mode may be triggered based on a hardware interrupt from an I/O device 206, an exception when an application program 232 attempts to access a location in memory 204 outside a virtual memory space allocated to the application program 232, or when an application program 232 running in the user space issues a system call to request that the operating system 212 perform some privileged operation. In the other direction, a transition to user mode may be triggered to a start a new process or thread in the user space, to return from an interrupt, an exception, a system call, etc. and thereby resume suspended execution, to perform a context switch from one process or thread running in the user space to a different user process or user thread, to provide an asynchronous notification to an application program 232 in the user space, and so on.

Figure 3:
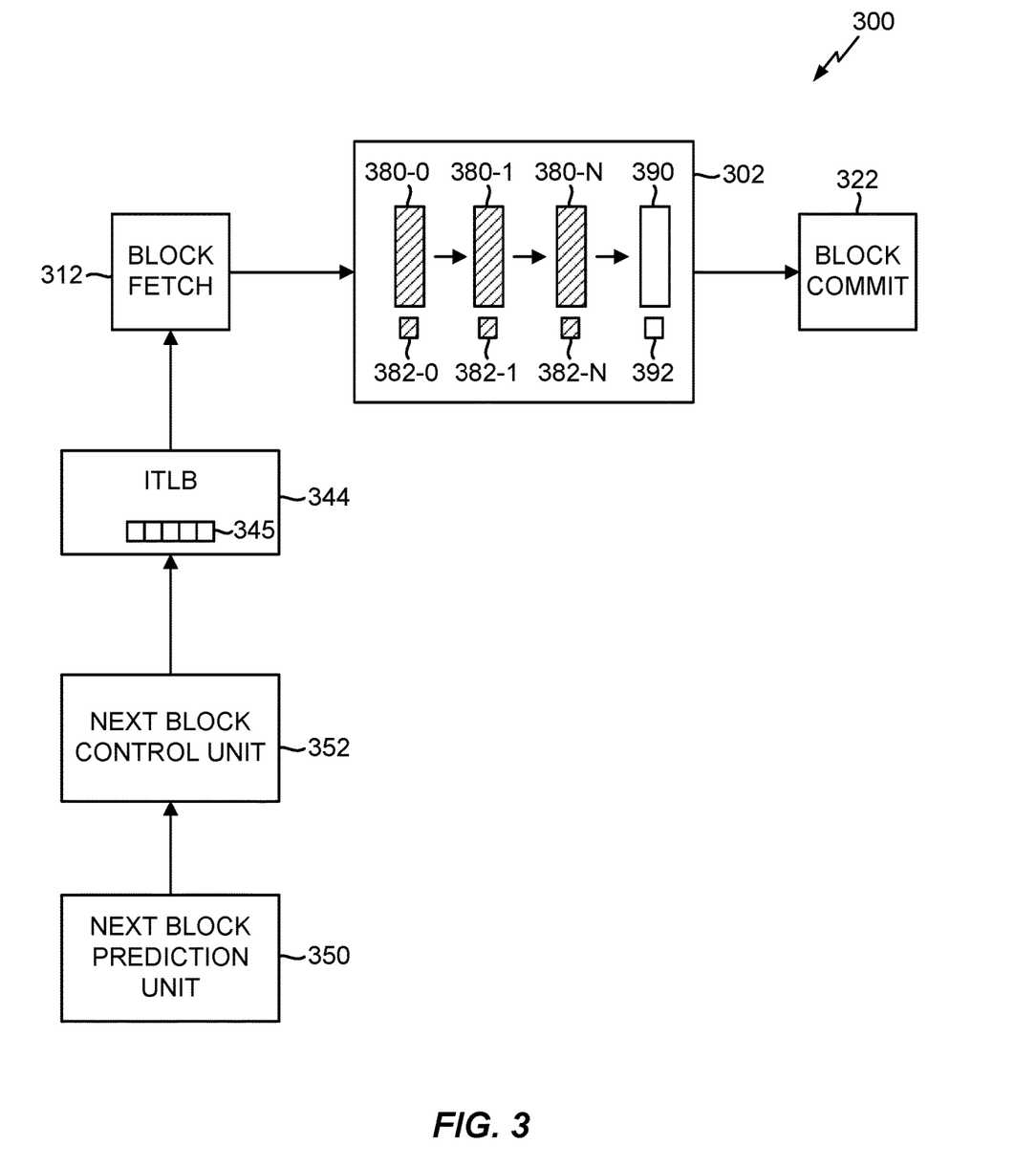
FIG. 3 illustrates an exemplary logical pipeline in which speculative transitions between different execution modes may be implemented, according to various aspects.

Accordingly, the separation between user mode and the privileged execution mode(s) offers various ways to improve security and stability in a machine; mode changes nonetheless can result in substantial delays in conventional systems that tend to require a full pipeline synchronization to effectuate a context switch from one mode to another. As such, according to various aspects, FIG. 3 illustrates an exemplary logical pipeline 300 in which speculative transitions between execution modes with different privilege levels may be implemented to reduce the substantial delays that could otherwise result from a context switch from one execution mode to another. In particular, the logical pipeline 300 may be designed to allow instructions from different execution modes to execute concurrently, which may include branch predictions to/from supervisor mode (e.g., for system calls and returns). As such, the cost to make a system call via an instruction executing in user mode can be reduced to approximately the same cost as a regular subroutine call. For example, referring to FIG. 3, a next block prediction unit 350 may be configured to predict a next instruction block to be executed in the logical pipeline 300 based on possible exits from one or more current instruction blocks 380, 390 in the logical pipeline 300. The next block prediction unit 350 may provide one or more appropriate signals to a next block control unit 352, which may set a program counter (PC) according to the predicted next instruction block and determine a virtual address associated therewith. The virtual address associated with the predicted next instruction block may be used to search page table entries 345 cached in an Instruction-side Translation Lookaside Buffer (ITLB) 344, wherein the page table entries 345 may generally map the virtual address to a physical address in main memory. Furthermore, according to various aspects, the page table entries 345 may include additional attributes associated with the page corresponding to the virtual address, including read permissions that indicate whether data can be read from the page, write permissions that indicate whether data can be written to the page, and execute permissions that indicate whether an instruction (e.g., ADD or MULTIPLY) can be performed using instruction opcodes stored in the page. Moreover, where the execute permissions indicate that an instruction can be performed using instruction opcodes stored in the page (i.e., the page is executable), the page table entries 345 may further indicate whether the page is executable in user mode only, in supervisor mode only, in hypervisor mode only, or in different execution modes (e.g., user or supervisor).

According to various aspects, the logical pipeline 300 shown in FIG. 3, an assumption may be made that transitions from one execution mode to another mode with a different privilege level only occur at instruction block boundaries; that is, if an instruction block transitions to or from supervisor mode, the new mode applies to the following instruction block. As such, at the front end in the pipeline 300, the physical address corresponding to the virtual address associated with the predicted next instruction block may be provided to the block fetch stage 312 along with the execute permissions and any mode-specific restrictions. The block fetch stage 312 may associate each fetched instruction block with the mode in which the instruction block is expected to execute, meaning that the mode bit is (speculatively) renamed on a per-block basis. As such, instruction fetching, decoding, permission checks, etc. are all performed relative to the speculative mode bit, and any exception that might arise due to an incorrect speculative mode is not recognized until the block becomes the least-speculative (oldest) block in the machine. For example, as shown in FIG. 3, a non-speculative instruction block 390 has a committed execution mode 392 associated therewith and in-flight instruction blocks 380 each have a speculative execution mode 382 associated therewith. Furthermore, among the in-flight instruction blocks 380, instruction block 380-N is the least speculative and instruction block 380-0 is the most speculative. Accordingly, based on the assumption mentioned above in which a transition to a different mode applies to the following instruction block, any changes that the non-speculative instruction block 390 makes to the committed execution mode 392 are applied to the least speculative block 380-N. The change to the committed mode 392 may therefore be compared to speculative (predicted) mode 382-N at the least speculative successor block 380-N, which may be flushed and restarted from the beginning of the pipeline 300 in the event that the speculative mode 382-N mismatches the new committed mode 392. However, because the flushed block 380-N would become the oldest block in the pipeline 300, the mode 382 can be made non-speculative and any page faults, permission checks, etc. can be made relative to the non-speculative mode in the conventional manner. Furthermore, because conventional approaches tend to require a full pipeline synchronization to effectuate a mode switch, a misprediction in the speculative mode 382 may essentially carry no penalty because the conventional approach would be to wait until every in-flight instruction in the current mode has committed before fetching even the first instruction in the new mode.

According to various aspects, the speculative mode 382 may be chosen based on a simple policy. In particular, when a program counter associated with an instruction block is translated (e.g., via a page table or an entry 345 in the ITLB 344), the permission bits indicating the mode(s) in which the page can be executed are examined In the most common case, the page will only be executable in one mode, in which case the predicted mode 382 is the one mode in which the page is executable. In some cases, however, the page may be permitted to execute in more than one mode (e.g., either supervisor mode or user mode), in which case the easiest policy to implement may be to have the predicted mode 382 be the current committed mode (e.g., because the machine does not have to save or locate the decision that was made with respect to the previous block). Alternatively, where the page is permitted to execute in more than one mode, another possible policy may be to have the predicted mode 382 be the same as the previous block (i.e., the previous most-speculative block), which may offer better performance than using the current committed mode. In cases where the page is not executable in any supported mode(s), the policy may be to simply wait until the block becomes non-speculative and then signal a page fault, as a non-executable page will generally result in an exception anyway.

According to various aspects, as further shown in FIG. 3, instruction blocks in the execute stage 302 that have completed may be provided to a block commit stage 322. In various embodiments, the block commit stage 322 may permit multiple instruction blocks to commit per cycle, provided that the non-speculative instruction block 390 does not change the committed mode 392 and the predicted mode 382-N at the successor block 380-N matches the current committed mode 392. However, in the event that the non-speculative instruction block 390 makes a change to the committed kernel/user mode 392, the block commit stage 322 may prevent any successor blocks 380-N to 380-0 from committing in the same cycle to allow sufficient time to check the predicted mode(s) 382-N to 380-0 in the manner described above. Furthermore, if the predicted mode 382-N at the successor block 380-N mismatches the current committed mode 392, the successor block 380-N may be prevented from committing due to the mode mismatch. Accordingly, when the non-speculative instruction block 390 does change the committed mode 392 and the predicted mode 382-N at the successor block 380-N also mismatches the current committed mode 392, the check against the predicted mode(s) 382-N to 380-0 may be deferred because the apparent mismatch in the mode may resolve successfully after the non-speculative instruction block 390 changes the committed mode 392.

According to various aspects, when combined with branch prediction that can predict the instruction block following a system call instruction to be the operating system kernel entry vector, the speculative aspects described above may allow system calls and returns to occur with essentially no disruption to the pipeline 300, even allowing out-of-order execution across instructions that execute in different modes with varying privileges. For example, when an instruction block executing in user mode makes a system call, the system call may be treated like a regular indirect call, wherein a "return address" may be pushed onto a return address stack (RAS) at the branch predictor. Accordingly, the RAS may be used to predict a subsequent return to user mode, wherein both the user mode instructions and the more privileged instructions should execute with the correct permissions in most implementations without requiring a full pipeline synchronization to effectuate the switch to/from any particular mode.

Figure 4:
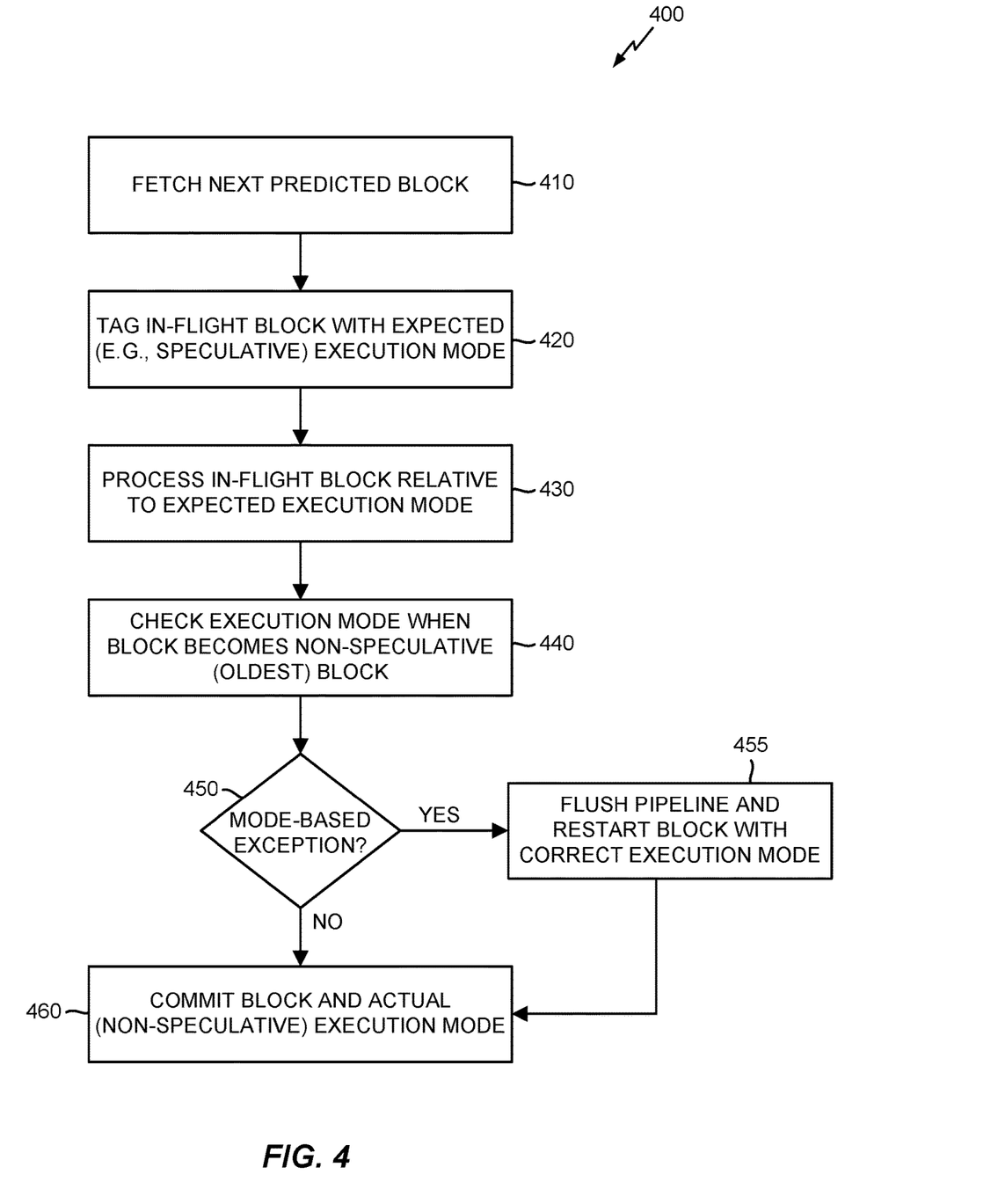
FIG. 4 illustrates an exemplary method to process an in-flight instruction block according to an expected execution mode, according to various aspects.

According to various aspects, FIG. 4 illustrates an exemplary method 400 to process an in-flight instruction block according to an expected execution mode. More particularly, according to various embodiments, the method 400 shown in FIG. 4 as described herein may be used to associate an individual instruction block with an expected execution mode, whereby a processor implementing the method 400 may generally perform the method 400 concurrently at different stages with respect to various individual instruction blocks that are in-flight within the processor pipeline.

In various embodiments, at block 410, an instruction block predicted to be next in an execution sequence may be fetched, wherein the next instruction block may be predicted using any suitable technique(s). In any case, the predicted next block may be associated with a program counter (PC) that may store, point to, or otherwise hold data that indicates a virtual address associated with the predicted next block. In various embodiments, at block 420, the predicted next block may be tagged or otherwise associated with an expected (e.g., speculative) execution mode, which may indicate whether the block is expected to execute in user mode, supervisor mode, hypervisor mode, or another suitable mode. According to various aspects, details relating to the manner in which the expected execution mode is determined are described below with reference to FIG. 5. In various embodiments, the in-flight instruction block may be processed relative to the expected execution mode at block 430. For example, instruction fetching, decoding, permission checks (e.g., page access, privileged instructions, etc.), and so on may all be performed at block 430 relative to the expected execution mode. Accordingly, while in-flight, the instruction block does not cause any exception(s), which are instead checked at block 440 when the in-flight block becomes non-speculative (i.e., the oldest block in the pipeline). In response to determining at block 450 that a mode-based exception did not occur, the instruction block may be committed along with the actual (non-speculative) execution mode at block 460. Alternatively, in response to determining at block 450 that a mode-based exception did occur, the instruction block may first be flushed and restarted at block 455 with the correct (non-speculative) execution mode. Further details relating to the manner in which the instruction block and the actual execution mode are committed will be described detail below with reference to FIG. 6.

Figure 5:
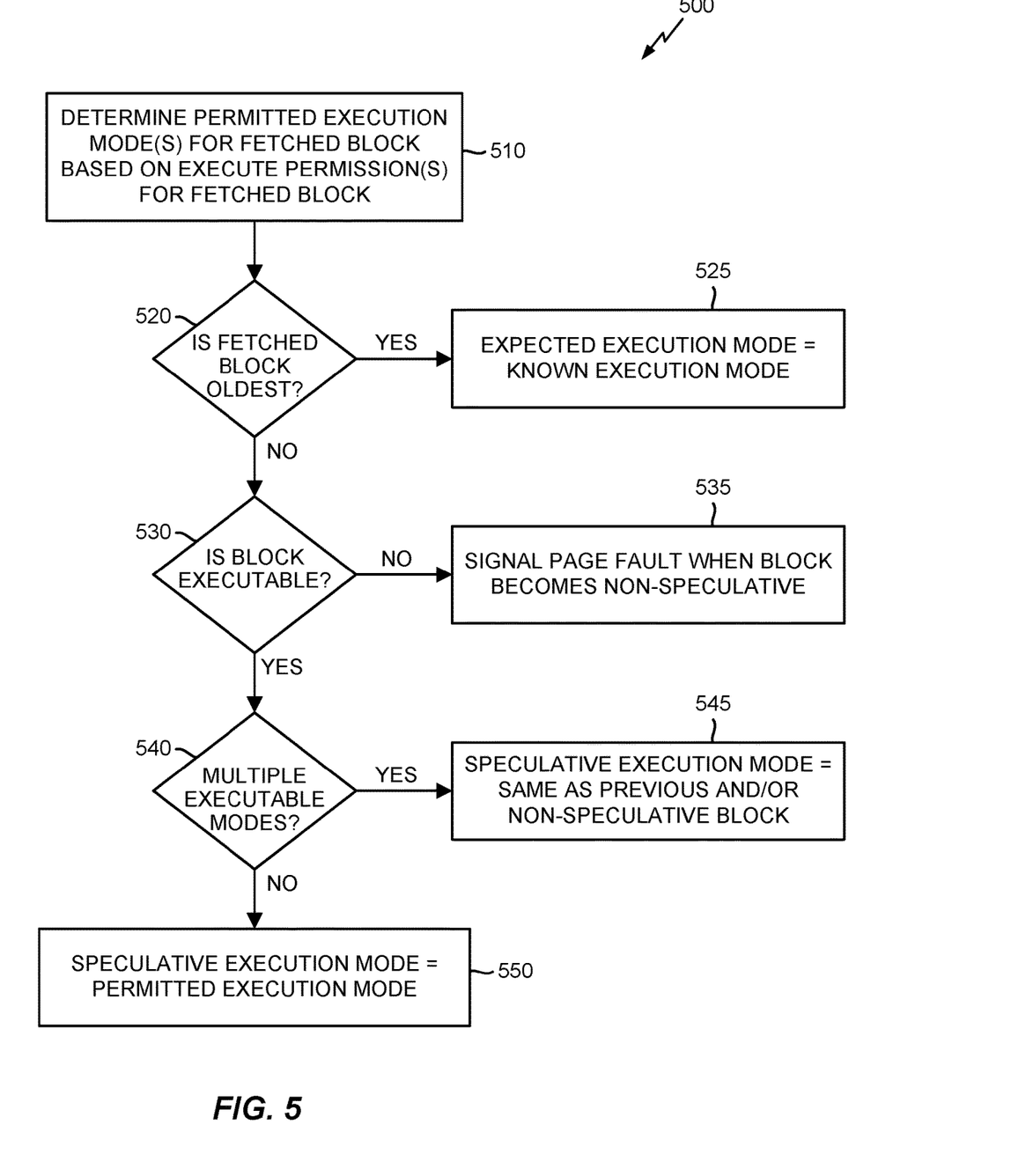
FIG. 5 illustrates an exemplary method to determine the expected execution mode associated with an in-flight instruction block, according to various aspects.

According to various aspects, FIG. 5 illustrates an exemplary method 500 to determine the expected execution mode associated with an in-flight instruction block, which may be carried out in context with block 420 in FIG. 4. For example, in various embodiments, a page table entry may be associated with the virtual address that stores one or more instruction opcodes associated with a next predicted block (e.g., in an ITLB). Accordingly, at block 510, the page table entry associated with the virtual address for the next predicted block may be checked to determine execute permissions associated with the next predicted block and the permitted execution mode(s), if any, may be determined based thereon. In various embodiments, an initial determination may be made at block 520 as to whether the fetched block is the oldest (i.e., only) block executing in the pipeline, in which case the expected execution mode can be determined with certainty at block 525. In such cases, which may occur when the block was restarted after a prior misprediction or other suitable circumstances, any page faults or other permission checks can also be determined based on the known non-speculative execution mode. However, in the event that the fetched block is not the oldest block executing in the pipeline, the execute permission bits in the page table entry translated from the program counter associated with the instruction block may be examined to determine whether the page mapped to instruction block is executable, as depicted at decision block 530, and if so, whether the instruction block is executable in multiple different modes, as depicted at decision block 540. In the case that the page mapped to the instruction block is not executable, a page fault may be signaled once the instruction block becomes non-speculative (i.e., the oldest block in the pipeline), as depicted at block 535. More likely, the page will be executable, with the rarer case being that the page is executable in multiple modes (e.g., either user mode or supervisor mode). In such cases, the speculative execution mode may be the same as the previous instruction block and/or the current committed mode maintained at the non-speculative instruction block, as depicted at block 545. In general, whether to have the speculative execution mode be the same as the previous instruction block or the same as the current committed mode may be implementation-dependent (e.g., using the same mode as the previous instruction block may be simpler because the machine does not have to save or locate the decision that was made with respect to the previous block, whereas using the current committed mode may offer better performance). In the most typical cases, the page will only be executable in one mode, in which case the speculative execution mode is the one permitted execution mode, as depicted at block 550.

Figure 6:
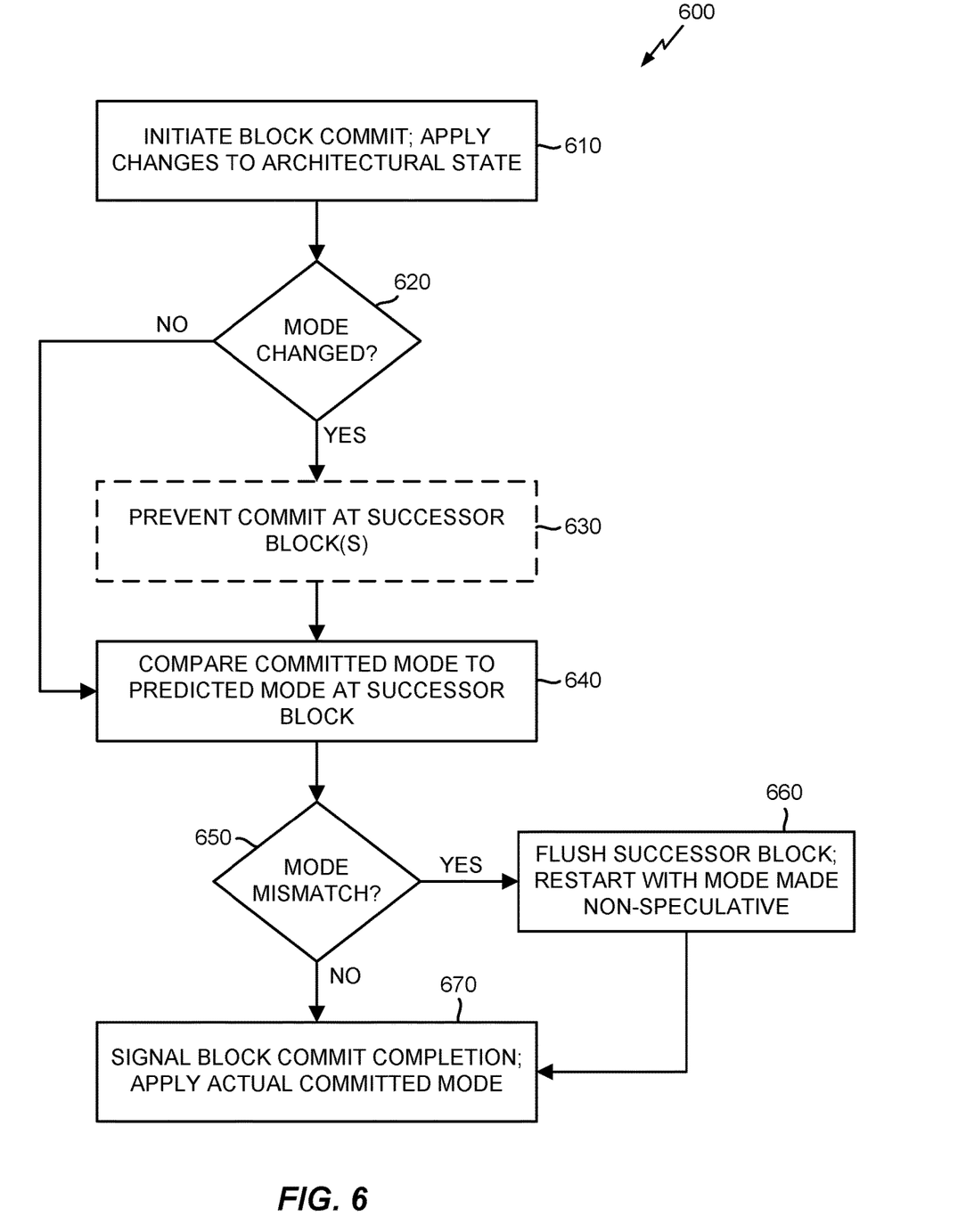
FIG. 6 illustrates an exemplary method to commit an instruction block according to an actual execution mode, according to various aspects.

According to various aspects, FIG. 6 illustrates an exemplary method 600 to commit an instruction block according to an actual execution mode, which may be carried out in context with block 460 in FIG. 4. In particular, a block commit protocol may be initiated at block 610, which may generally comprise applying one or more changes to an architectural state. For example, any speculative or in-flight operations may be written back to memory to apply the changes to the architectural state. Furthermore, any changes that the committed block makes to a committed executed mode may be applied at block 610, including any change from user mode to kernel mode, from kernel mode to user mode, to/from hypervisor mode, etc. In various embodiments, at block 620, a check may be performed to determine whether the committed instruction block changed the committed execution mode. In particular, as mentioned earlier, mode transitions only take place at block boundaries, whereby any transition that the committed instruction block makes to the committed execution mode applies to the following (successor) instruction block. Accordingly, the check may be performed at block 620 to assess whether the change to the committed execution mode necessitates any repairs to the pipeline. As such, where the committed instruction block does change the committed execution mode, further checks may be needed. For example, in an architecture that allows multiple instruction blocks to commit in the same cycle, an optional block 630 may be implemented to prevent the successor block(s) from committing to allow sufficient opportunity to check the speculative execution mode at the successor block(s) against the new committed mode that the committed instruction block is applying.

In various embodiments, at block 640, the committed mode may be compared to the predicted (speculative) execution mode at the successor block. Accordingly, in response to determining at block 650 that the committed mode matches the speculative execution mode, the block commit completion may be signaled at block 670 and the method 600 may appropriately end with respect to the current committed instruction block. However, in response to detecting a mismatch between the new committed mode and the speculative execution mode at block 650, the successor block is flushed and restarted with the mode made non-speculative at block 660 before signaling that block commit is completed to allow other instruction blocks to commit as needed. Furthermore, in embodiments where the architecture permits multiple instruction blocks to commit in the same cycle, the successor block may be prevented from committing simultaneously with the current block where the current committed mode mismatches the predicted mode at the successor block. However, where block 620 indicates that the committed instruction block is changing the committed execution mode, the apparent mismatch detected at block 650 may successfully resolve after the non-speculative block has changed the committed mode. Accordingly, the successor block state comparison may be performed at block 640 whether or not the committed instruction block is changing the committed execution mode. However, in the latter case (where the committed execution mode is not changed), the predicted mode at the successor block may be continuously compared to the committed mode at block 640 without having to wait until the oldest instruction block changes the committed execution mode.

Figure 7:
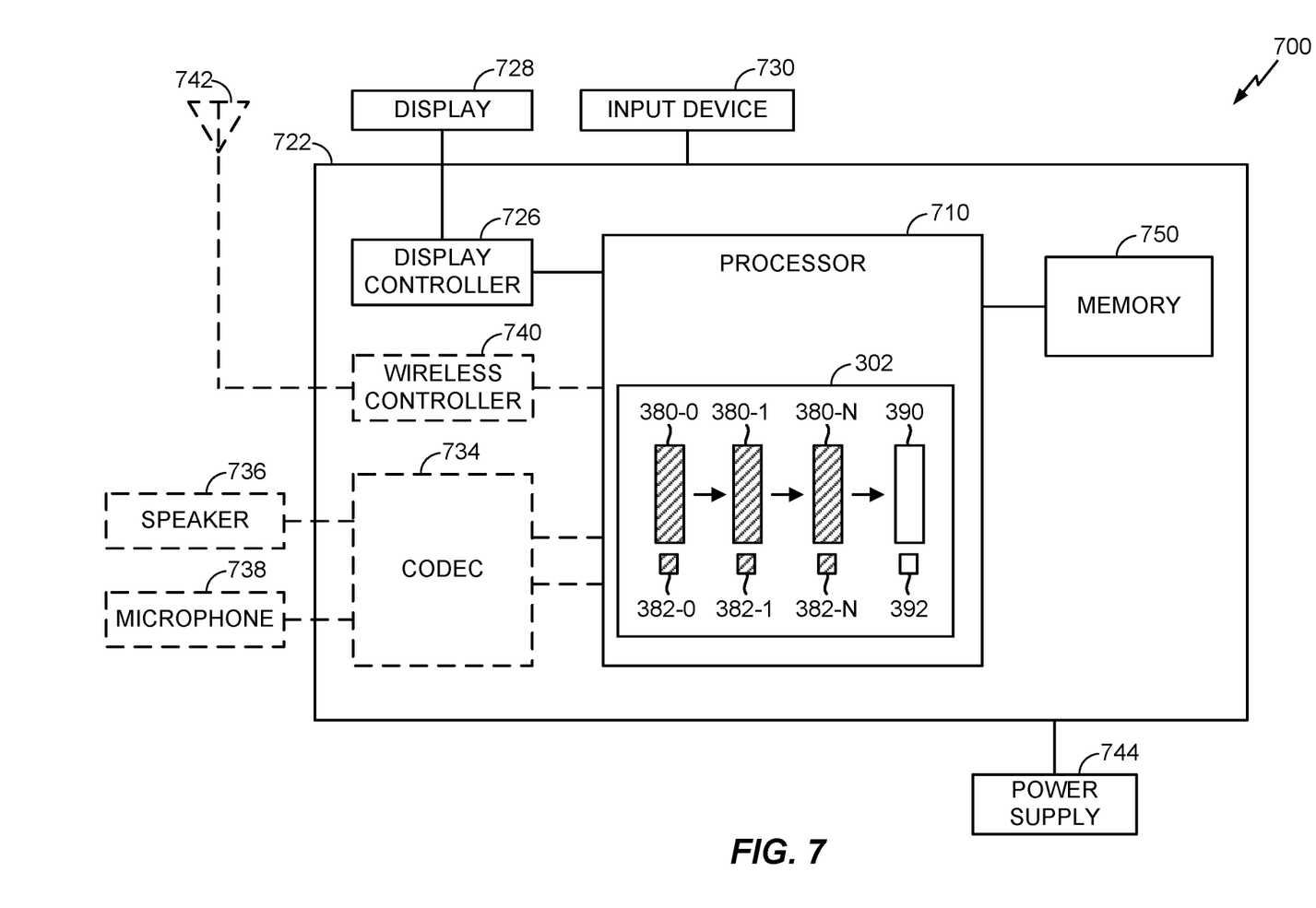
FIG. 7 illustrates an example electronic device in which the speculative mode transitions as described herein may be advantageously implemented.

According to various aspects, FIG. 7 illustrates an example electronic device 700 in which the speculative transitions among execution modes with different privilege levels as described in further detail above with reference to FIG. 1 through FIG. 6 may be advantageously implemented. In various embodiments, the electronic device 700 may be configured as a wireless device. As shown in FIG. 7, the electronic device 700 may include a processor 710, which can be a digital signal processor (DSP) or any general purpose processor or central processing unit (CPU) as known in the art, for example. In various embodiments, the processor 710 may implement a logical pipeline as shown in FIG. 3, except that for clarity purposes, FIG. 7 only illustrates exemplary structures corresponding to the execution stage 302 in which in-flight instruction blocks 380-0 to 380-N are each associated with a speculative execution mode 382-0 to 382-N and a committed instruction block 390 is associated with a committed execution mode 392. Furthermore, in various embodiments, the processor 710 may be configured to perform the methods 400, 500, 600 as shown in FIG. 4 to FIG. 6 and described in further detail above. As further shown in FIG. 7, the processor 710 may include and/or be communicatively coupled to a memory 750, which may comprise one or more caches or other memory structures described in further detail above (e.g., an L1 instruction cache and associated ITLB, an L1 data cache and associated TLB, an L2 cache, etc.).

According to various embodiments, FIG. 7 also shows that the electronic device 700 may include a display controller 726 coupled to the processor 710 and to a display 728. The electronic device 700 may further include a coder/decoder (CODEC) 734 (e.g., an audio and/or voice CODEC) coupled to processor 710. Other components, such as a wireless controller 740 (e.g., a modem) are also illustrated in FIG. 7. In various embodiments, a speaker 736 and a microphone 738 can be coupled to the CODEC 734. Furthermore, as shown in FIG. 7, the wireless controller 740 can be coupled to a wireless antenna 742. According to various aspects, the processor 710, the display controller 726, the memory 750, the CODEC 734, and/or the wireless controller 740 may be provided in a system-in-package or a system-on-chip device 722.

In various embodiments, an input device 730 and a power supply 744 may be coupled to the system-on-chip device 722. Moreover, as illustrated in FIG. 7, the display 728, the input device 730, the speaker 736, the microphone 738, the wireless antenna 742, and the power supply 744 are shown as being external to the system-on-chip device 722. However, those skilled in the art will appreciate that the display 728, the input device 730, the speaker 736, the microphone 738, the wireless antenna 742, and/or the power supply 744 can be coupled to a component associated with the system-on-chip device 722 (e.g., via an interface or a controller). Furthermore, although FIG. 7 depicts the electronic device 700 as a wireless communications device, those skilled in the art will appreciate that the various components illustrated in FIG. 7 may be integrated into a set top box, a music player, a video player, an entertainment unit, a navigation device, a personal digital assistant (PDA), a fixed location data unit, a computer, a laptop, a tablet, a communications device, a mobile phone, etc.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for managing a processor pipeline, comprising:

translating a program counter associated with an instruction block of a plurality of instruction blocks to be fetched to a page table entry storing one or more execute permissions associated with the instruction block, wherein each instruction block of the plurality of instruction blocks includes an indication of how many instructions are grouped in the instruction block;

setting a different speculative mode bit for each of the plurality of instruction blocks based on the stored one or more execute permissions;

associating the instruction block with a speculative execution mode based at least in part on the set speculative mode bit; and processing the instruction block relative to the speculative execution mode while the instruction block is in-flight within the processor pipeline, wherein each instruction block is processed atomically.

2. The method recited in claim 1, wherein the program counter associated with the instruction block points to a virtual address that corresponds to the page table entry storing the one or more execute permissions associated with the instruction block.

3. The method recited in claim 1, wherein the page table entry that stores the one or more execute permissions is stored in an instruction-side translation lookaside buffer.

4. The method recited in claim 1, wherein the speculative execution mode is a mode in which a memory page corresponding to the instruction block is executable in response to the one or more execute permissions indicating that the memory page is only executable in one mode.

5. The method recited in claim 1, wherein the speculative execution mode matches an execution mode associated with a prior instruction block in the processor pipeline in response to the one or more execute permissions indicating that a memory page corresponding to the instruction block is executable in multiple modes.

6. The method recited in claim 1, wherein the speculative execution mode matches a committed mode in response to the one or more execute permissions indicating that a memory page corresponding to the instruction block is executable in multiple modes.

7. The method recited in claim 1, wherein the speculative execution mode includes information to signal a page fault upon the instruction block becoming an oldest block executing in the processor pipeline in response to the one or more execute permissions indicating that a memory page corresponding to the instruction block is not executable.

8. The method recited in claim 1, further comprising:
checking the speculative execution mode associated with the instruction block against a committed execution mode upon the instruction block becoming an oldest block executing in the processor pipeline; and
restarting the instruction block in response to determining that the speculative execution mode mismatches the committed execution mode.

9. The method recited in claim 1, further comprising:
checking the speculative execution mode associated with the instruction block against a committed execution mode upon the instruction block becoming an oldest block executing in the processor pipeline; and
committing the instruction block in response to determining that the speculative execution mode matches the committed execution mode.

10. The method recited in claim 9, further comprising preventing at least one successor instruction block from committing in a same cycle as the instruction block in response to the instruction block changing the committed execution mode.

11. The method recited in claim 10, further comprising flushing and restarting the at least one successor instruction block in response to the instruction block changing the committed execution mode to an execution mode that mismatches a speculative execution mode associated with the at least one successor instruction block.

12. The method recited in claim 9, further comprising preventing at least one successor instruction block from committing in a same cycle as the instruction block in response to the at least one successor instruction block having a speculative execution mode that mismatches the committed execution mode.

13. The method recited in claim 1, wherein the speculative execution mode is a user mode in which permitted instructions are restricted and memory access is limited to a virtual memory space allocated to the instruction block.

14. The method recited in claim 1, wherein the speculative execution mode is a supervisor mode in which privileged instructions are permitted to be executed and access to physical hardware resources is permitted.

15. The method recited in claim 14, wherein the supervisor mode is one of a plurality of execution modes in which the privileged instructions are permitted to be executed and access to the physical hardware resources is permitted.

16. An apparatus, comprising:
a processor configured to fetch an instruction block of a plurality of instruction blocks, translate a program counter associated with the instruction block to a page table entry storing one or more execute permissions associated with the instruction block, wherein each instruction block of the plurality of instruction blocks includes an indication of how many instructions are grouped in the instruction block set a different speculative mode bit for each of the plurality of instruction blocks based on the stored one or more execute permissions, associate the instruction block with a speculative execution mode based at least in part on the set speculative mode bit, and process the instruction block relative to the speculative execution mode while the instruction block is in-flight within a pipeline, and wherein each instruction block is processed atomically.

17. The apparatus recited in claim 16, further comprising an instruction-side translation lookaside buffer (ITLB) configured to store the one or more execute permissions associated with the instruction block in the page table entry, wherein the program counter associated with the instruction block points to a virtual address that corresponds to the page table entry storing the one or more execute permissions associated with the instruction block.

18. The apparatus recited in claim 16, wherein the processor is further configured to set the speculative execution mode to a mode in which a memory page corresponding to the instruction block is executable in response to the one or more execute permissions indicating that the memory page is only executable in one mode.

19. The apparatus recited in claim 16, wherein the processor is further configured to set the speculative execution mode to one or more of a committed mode or an execution mode associated with a prior instruction block in the pipeline in response to the one or more execute permissions indicating that a memory page corresponding to the instruction block is executable in multiple modes.

20. The apparatus recited in claim 16, wherein the processor is further configured to set the speculative execution mode to signal a page fault upon the instruction block becoming an oldest block executing in the pipeline in response to the one or more execute permissions indicating that a memory page corresponding to the instruction block is not executable.

21. The apparatus recited in claim 16, wherein the processor is further configured to:

check the speculative execution mode associated with the instruction block against a committed execution mode upon the instruction block becoming an oldest block executing in the pipeline; and restart the instruction block in response to determining that the speculative execution mode mismatches the committed execution mode.

22. The apparatus recited in claim 16, wherein the processor is further configured to:

check the speculative execution mode associated with the instruction block against a committed execution mode upon the instruction block becoming an oldest block executing in the pipeline; and commit the instruction block in response to determining that the speculative execution mode matches the committed execution mode.

23. The apparatus recited in claim 22, wherein the processor is further configured to prevent at least one successor instruction block from committing in a same cycle as the instruction block in response to the instruction block changing the committed execution mode.

24. The apparatus recited in claim 23, wherein the processor is further configured to flush and restart the at least one successor instruction block in response to the instruction block changing the committed execution mode to an execution mode that mismatches a speculative execution mode associated with the at least one successor instruction block.

25. The apparatus recited in claim 22, wherein the processor is further configured to prevent at least one successor instruction block from committing in a same cycle as the instruction block in response to the at least one successor instruction block having a speculative execution mode that mismatches the committed execution mode.

26. The apparatus recited in claim 16, wherein the speculative execution mode is a user mode in which permitted instructions are restricted and memory access is limited to a virtual memory space allocated to the instruction block.

27. The apparatus recited in claim 16, wherein the speculative execution mode is a supervisor mode in which privileged instructions are permitted to be executed and access to physical hardware resources is permitted.

28. The apparatus recited in claim 27, wherein the supervisor mode is one of a plurality of execution modes in which the privileged instructions are permitted to be executed and access to the physical hardware resources is permitted.

29. An apparatus, comprising:

means for translating a program counter associated with an instruction block of a plurality of instruction blocks to be fetched to a page table entry storing one or more execute permissions associated with the instruction block, wherein each instruction block of the plurality of instruction blocks includes an indication of how many instructions are grouped in the instruction block;

means for setting a different speculative mode bit for each of the plurality of instruction blocks based on the stored one or more execute permissions;

means for associating the instruction block with a speculative execution mode based at least in part on the set speculative mode bit; and means for processing the instruction block relative to the speculative execution mode while the instruction block is in-flight within a processor pipeline, wherein each instruction block is processed atomically.

30. A non-transitory computer-readable medium storing computer-executable instructions, the stored computer-executable instructions configured to cause a processor to:

translate a program counter associated with an instruction block of a plurality of instruction blocks to be fetched to a page table entry storing one or more execute permissions associated with the instruction block, wherein each instruction block of the plurality of instruction blocks includes an indication of how many instructions are grouped in the instruction block;

set a different speculative mode bit for each of the plurality of instruction blocks based on the stored one or more execute permissions;

associate the instruction block with a speculative execution mode based at least in part on the set speculative mode bit; and process the instruction block relative to the speculative execution mode while the instruction block is in-flight within a pipeline associated with the processor, wherein each instruction block is processed atomically.

* * * * *